(12) United States Patent
Nakayama et al.

(10) Patent No.: US 7,455,903 B2
(45) Date of Patent: Nov. 25, 2008

(54) OPTICAL MATERIALS AND OPTICAL ELEMENTS USING THE SAME

(75) Inventors: Daisuke Nakayama, Kanagawa (JP);
Hiroaki Tsutsui, Kanagawa (JP);
Ryojiro Akashi, Kanagawa (JP);
Masahiro Moriyama, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 194 days.

(21) Appl. No.: 11/127,422

(22) Filed: May 12, 2005

(65) Prior Publication Data

US 2006/0121285 A1 Jun. 8, 2006

(30) Foreign Application Priority Data

Dec. 2, 2004 (JP) .............................. 2004-349902

(51) Int. Cl.
*B32B 5/16* (2006.01)
*C09K 19/00* (2006.01)
*G02F 1/01* (2006.01)

(52) U.S. Cl. ...................... 428/327; 428/1.31; 428/323; 359/288

(58) Field of Classification Search ................ 428/1.31; 359/264, 288
See application file for complete search history.

(56) References Cited

U.S. PATENT DOCUMENTS

| | | | | |
|---|---|---|---|---|
| 4,779,962 A * | 10/1988 | Nishimura et al. | .......... | 359/245 |
| 5,007,714 A * | 4/1991 | Nishimura et al. | .......... | 359/241 |
| 5,731,101 A * | 3/1998 | Sherif et al. | ................ | 429/102 |
| 6,287,485 B1 * | 9/2001 | Akashi et al. | ............... | 252/583 |
| 6,369,792 B1 * | 4/2002 | Kikinis | ........................ | 345/107 |
| 6,740,807 B2 * | 5/2004 | Ono | ............................ | 136/263 |
| 7,033,674 B2 * | 4/2006 | Thorp et al. | ................ | 428/457 |

FOREIGN PATENT DOCUMENTS

| JP | 61-149926 | 7/1986 |
|---|---|---|
| JP | 61-151621 | 7/1986 |
| JP | 61-151625 | 7/1986 |
| JP | 3543641 | 8/1991 |
| JP | 4-134325 | 5/1992 |
| JP | 4-274480 | 9/1992 |
| JP | 5-188354 | 7/1993 |
| JP | 62-925 | 7/1994 |
| JP | 62-927 | 7/1994 |
| JP | 7-95172 | 4/1995 |
| JP | 9-160081 | 6/1997 |

OTHER PUBLICATIONS

S. Panozzo et al. "Light emitting electrochemical cells using a molten delocalized salt", Applied Physics Letters, vol. 80, No. 4, pp. 679-681, Jan. 28, 2002.*

F. Habrand et al. "Conjugated Polymer / Molten Salt Blend Optimization". The Journal of Physical Chemistry Letters, vol. 110, pp. 15049-15051, Jul. 15, 2006.*

Streitwieser and Heathcock "Introduction to Organic Chemistry", Section 10.3 "Physical Properties of Alcohols", Second Edition, pp. 233-239, copyright 1981.*

* cited by examiner

*Primary Examiner*—Sheeba Ahmed
(74) *Attorney, Agent, or Firm*—Fildes & Outland, P.C.

(57) ABSTRACT

An optical material comprising an ionic liquid and a polymer gel including a light controlling material, wherein the polymer gel absorbs and/or releases the ionic liquid in accordance with a temperature change. Also provided is an optical element comprising two substrates and the optical material between the two substrates.

17 Claims, 4 Drawing Sheets

OPTICAL MATERIALS AND OPTICAL ELEMENTS USING THE SAME

CROSS-REFERENCE TO RELATED APPLICATIONS

This application claims priority under 35 USC 119 from Japanese patent Application No. 2004-349902, the disclosure of which is incorporated by reference herein.

BACKGROUND OF THE INVENTION

1. Field of the Invention

The present invention is concerned with optical materials and optical elements using the same.

2. Description of the Related Art

Techniques have been known which can control light or develop color by using polymer gel materials to control light transmittance and light scattering property; in the techniques, the polymer gel materials are stimulus-responsive polymer gels which reversibly change their volumes (swell and contract) when provided with stimuli such as pH change, ionic strength change, adsorption and desorption of chemical substances, change in solvent composition, application of heat, application of light, and application of electric stimuli.

The following techniques have been known as techniques for controlling light transmittance and light scattering property without using colorants. Elements are proposed in Japanese Patent Application Laid-Open (JP-A) Nos. 61-151621 and 62-925. The elements each control light scattering by changing the difference in refractive index between the solvent and a polymer gel. When the temperature is changed, the polymer gel absorbs or releases liquid, so that the polymer gel swells or contracts in accordance with the temperature change. The elements can control light scattering by utilizing the change in refractive index of the polymer gel accompanying the swelling or contraction of the polymer gel. Therefore, the elements can display images.

Other elements have been proposed (for example in JP-A No. 4-134325) which display images utilizing the change in light scattering property of a polymer gel upon swelling or contraction of the polymer gel caused by an electric stimulus. Further, elements have been proposed (for example in Japanese Patent Publication (JP-B) No. 7-95172) which display images utilizing the change in light scattering property of a polymer gel; the light scattering property changes when a conductive polymer in the polymer gel is doped or undoped with ions to change the pH. Moreover, elements are disclosed (for example in JP-A No. 5-188354) which display images formed by transparent areas and opaque areas; the elements each use a polymer gel which absorbs or releases liquid according to change in electric field to swell or contract, the elements utilize the swelling and contraction of the polymer gel so that the elements can shield light, reflect light, scatter light or control light transmittance, thereby displaying images.

The following techniques have been known which can control color developing property using colorants. Light controlling elements are disclosed (for example in JP-A No. 61-149926) which each comprise a combination of a colored liquid containing a pigment dispersed therein and a polymer gel which absorbs or releases liquid according to change in electric field; in the elements, the shape of the polymer gel changes to move the colored liquid, thereby displaying images. Elements are disclosed (for example in JP-A Nos. 61-151625 and 62-927) which use a colored polymer gel; in the elements, the optical density decreases when the polymer gel swells and the optical density increases when the polymer gel contracts. Elements are disclosed (for example in JP-A No. 4-274480) which uses a polymer gel bound to a colorant; in the elements, the optical density is changed by a change in the volume of the polymer gel, thereby displaying images. Further, elements are disclosed (for example in JP-A No. 9-160081) whose hues are changed by a change in the volume of a polymer gel on which pigment particles or colored particles are adsorbed; in the elements, white color is displayed when the polymer gel swells and the color of the pigment particles or the colored particles is displayed when the polymer gel contracts, thereby displaying images.

The inventors of the present invention proposed novel color developing materials which are excellent in contrast (for example in Japanese Patent No. 03543641). The color developing materials each include a composition containing a polymer gel and a pigment. The polymer gel is a polymer gel which can swell or contract by absorbing or releasing liquid when a stimulus is applied. The pigment is contained in the polymer gel and the concentration of the pigment is not lower than the saturated absorption concentration. When the polymer gel contracts, the pigment aggregates locally to decrease the light absorption efficiency, so that the composition has a high light transmittance. When the polymer gel swells, the pigment diffuses in the entire composition to increase the light absorption efficiency, so that the composition develops color.

Conventional light controlling techniques and color developing techniques using polymer gels have used water, water-based liquids, and highly volatile organic solvents as the liquids to be absorbed or released by the polymer gel. Therefore, it has been necessary to prevent evaporation of the liquids by sealing the polymer gels and the liquids in cells formed by glass substrates and the like. When the substrates are resin films, the resin films have to have a high gas-blocking property, so that the costs of the substrates increase. Further, it has been quite difficult to prevent evaporation of the liquids for a long time even when the liquids are sealed in such cells.

SUMMARY OF THE INVENTION

An aspect of the present invention is to provide an optical material comprising an ionic liquid and a polymer gel including a light controlling material. The polymer gel is a polymer gel which can absorb and/or release the ionic liquid according to change in temperature.

Another aspect of the invention is to provide an optical element comprising two substrates and the optical material described above, and the optical material is sandwiched between the two substrates.

The ionic liquid may include a substance selected from imidazolium salts, piridinium salts, and salts of aliphatic ammoniums. The polymer gel may be in a particle state having an average particle diameter of 1 μm to 5 mm. The light controlling material may be a pigment and the concentration of the pigment in the polymer gel may be not lower than the saturated absorption concentration.

DESCRIPTION OF THE PRESENT INVENTION

Figure 1A:
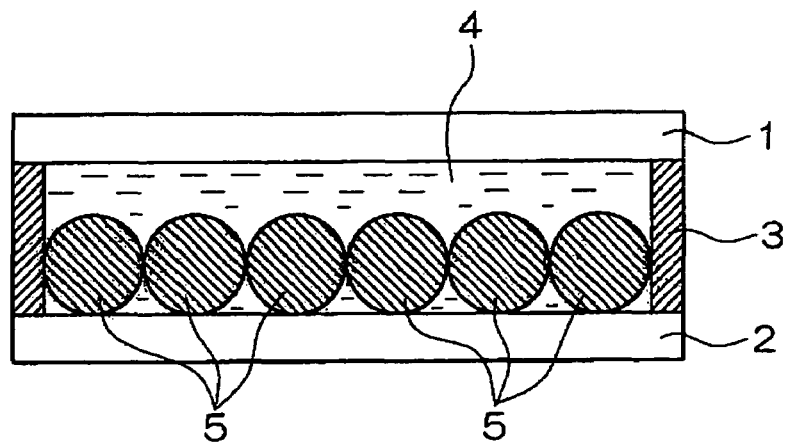
FIGS. 1A and 1B are schematic diagrams illustrating an embodiment of the optical element of the invention.

The present invention has been achieved by focusing on the liquid (liquid for swelling) which is absorbed and/or released by the gel and which has been a factor causing the problems of the conventional techniques. In the present invention, the liquid is an ionic liquid having a remarkably low vapor pressure.

As described above, in the conventional techniques for light control and color development using a polymer gel, the liquid which is absorbed and/or released by the polymer gel has been water, water-based liquid, or a volatile organic solvent. The absorption and release of the liquid are supposed to be caused by many factors, and a change in solubility of the polymer gel components in the solvent is considered an important factor. Therefore, the difference of the solvent is supposed to significantly affect the behavior of the polymer gel. Accordingly, the behavior of the gel in a solvent other than the solvents which have been conventionally used has not been reported and cannot be anticipated either.

In the course of the research leading to the present invention, it was found for the first time that the polymer gel, when placed in an ionic liquid, absorbs and/or releases the ionic liquid in response to the heat. The present invention has been achieved based on the above finding.

It has also been found that conventional techniques involving control of color development by a colorant and a polymer gel can be used in the present invention regardless of the their mechanisms.

For example, the following techniques can be used in the present invention: the techniques disclosed in JP-A Nos. 61-151625 and 62-927 (the disclosures of which are incorporated herein by reference) comprising changing the optical density by changing the volume of a colored responsive polymer gel; the techniques disclosed in JP-A No. 4-274480 (the disclosure of which is incorporated herein by reference) comprising changing the optical density by changing the volume of the responsive polymer gel bound to a dye; the techniques disclosed in JP-A No. 9-160081 (the disclosure of which is incorporated herein by reference) comprising modulating the light scattering by changing the shape of a responsive polymer gel on which a pigment is adsorbed; and the techniques disclosed in Japanese Patent No. 3543641 (the disclosure of which is incorporated herein by reference) comprising changing the light transmittance by causing local aggregation of a pigment by allowing a responsive polymer gel to contract, wherein the polymer gel contains a pigment at a concentration which is not lower than the saturated absorption concentration.

In the following, the present invention is described in detail.

1 Polymer Gel

The polymer gel to be used in the invention may be a polymer gel whose volume can be changed by heat reversibly or irreversibly. The polymer gel is preferably a polymer gel whose volume can be changed reversibly by heat. If the volume change of a polymer gel is irreversible, the polymer gel can be used in a disposable optical element.

The polymer gel may be ionic or nonionic.

The polymer gel is preferably a homopolymer or copolymer comprising a monomer or monomers selected from the group consisting of (meth)acrylic acid, acrylamide, maleic acid, cellulose, vinyl alcohol, vinyl sulfonic acid, derivatives thereof, and salts thereof.

In the invention, the polymer gel may be prepared by a known process such as suspension polymerization, emulsion polymerization, dispersion polymerization, or seed polymerization. In an embodiment, the polymer gel is prepared by suspension polymerization, utilizing an emulsification method known as the membrane emulsification method. A polymerization initiating catalyst known in the art may be optionally used in the preparation of the polymer gel. Examples of the polymerization initiating catalyst include: organic peroxides (such as alkylhydroperoxides); inorganic peroxides (such as hydrogen peroxide); oil-soluble azo-based organic compounds (such as AIBN); and water-soluble azo-based organic compounds (such as 2,2'-azobis(2-amidinopropane)diacid salt). When a polymerization initiating catalyst is used, the amount of the polymerization initiating catalyst is a sufficient amount for initiating the polymerization well. Such an amount is well-known in the art.

The polymer gel to be used in the invention has a net-like structure formed by cross-linking. The cross-linking may be conducted during polymerization or after polymerization. The method for the cross-linking is not particularly limited, and may be, for example: addition of a cross-linking agent; irradiation with electromagnetic wave; irradiation with electron beams; or irradiation with particle beams. The type of the cross-linking agent is not particularly limited and may be, for example, N,N'-methylenebisacrylamide, divinylbenzene, ethylene glycol dimethacrylate, urea resin, or melamine resin.

The swelling ratio of the polymer gel changes in accordance with the cross-linking degree of the polymer gel. In the invention, the cross-linking degree is preferably such a degree that the ratio of the number of the cross-linking points to the number of the repeating units constituting the main chain is 0.001 to 50% by mol, more preferably 0.01 to 50% by mol. When a cross-linking agent is used for cross-linking, the amount of the cross-linking agent is 0.001 to 50% by mol based on the amount of the monomer consitituting the polymer gel, more preferably 0.01 to 10% by mol based on the amount of the monomer constituting the polymer gel.

The volume change of the heat-responsive polymer gel is preferably large; the ratio of the volume of the polymer gel at the time of swelling to the volume of the polymer gel at the time of contraction is preferably not lower than 5, more preferably not lower than 10, still more preferably not lower than 15. When the ratio is lower than 5, the volume change caused by swelling or contraction is small, whereby the pigment does not change its state satisfactory between the dispersed state and the aggregated state and the contrast of the image displayed by the resultant optical element is likely to be insufficient.

Examples of the polymer gel include: cross-linked products of poly(meth)acrylic acid and salts thereof; cross-linked copolymers of (meth)acrylic acid with (meth)acrylamide, hydroxyethyl(meth)acrylate, alkyl (meth)acrylate ester or the like, and salts thereof; cross-linked products of polymaleic acid and salts thereof; cross-linked copolymers of maleic acid with (meth)acrylamide, hydroxyethyl (meth)acrylate, alkyl (meth)acrylate ester or the like and salts thereof; cross-linked products of polyvinylsulfonic acid; cross-linked copolymers of vinylsulfonic acid with (meth)acrylamide, hydroxyethyl (meth)acrylate, alkyl (meth)acrylate ester or the like, and salts thereof; cross-linked products of polyvinybenzenesulfonic acid and salts thereof; cross-linked copolymers of vinybenzenelsulfonic acid with (meth)acrylamide, hydroxyethyl (meth)acrylate, alkyl (meth)acrylate ester or the like, and salts thereof; cross-linked products of polyacrylamidealkylsulfonic acid and salts thereof; cross-linked copolymers of acrylamidealkylsulfonic acid with (meth)acrylamide, hydroxyethyl (meth)acrylate, alkyl (meth)acrylate ester or the like, and salts thereof; cross-linked products of polydimethylaminopropyl(meth)acrylamide, and hydrochloric acid salts thereof; cross-linked copolymers of dimethylaminopropyl (meth)acrylamide with (meth)acrylic acid, (meth)acrylamide, hydroxyethyl (meth)acrylate, alkyl (meth)acrylate ester or the like, quarternarized products thereof, and salts thereof; cross-linked composites of polydimethylaminopropyl(meth)acrylamide and polyvinylalcohol, quarternarized products thereof, and salts thereof; cross-linked composites of polyvinylalcohol and poly(meth)acrylic acid, and salts thereof; cross-linked products of carboxyalkylcellulose salt; partially hydrolyzed cross-linked products of poly(meth)acrylonitrile, and salts thereof; cross-linked products of polyvinylsulfonic acid; cross-linked products of copolymers of vinylsulfonic acid with (meth)acrylamide, hydroxyethyl (meth)acrylate, alkyl(meth)arylate ester, or the like; cross-linked products of polyvinylbenzenesulfonic acid; cross-linked products of copolymers of vinylbenzensulfonic acid with (meth)acrylamide, hydroxyethyl(meth)acrylate, alkyl (meth)acrylate ester, or the like; cross-linked products of poly(meth)acrylamide alkylsulfonate; cross-linked products of copolymers of (meth)acrylamide alkylsulfonate with (meth)acrylamide, hydroxyethyl(meth)acrylate, alkyl(meth)acrylate ester, or the like; cross-linked products of N-alkyl-substituted(meth)acrylamides such as poly(N-isopropylacrylamide); cross-linked products of copolymers each comprising two or more monomers selected from N-alkyl-substituted(meth) acrylamides, salts of N-alkyl-substituted (meth)acrylamides, (meth)acrylamide, alkyl(meth)acrylate ester, and the like; cross-linked products of polyvinylmethyl ether; cross-linked products of alkyl-substituted cellulose derivatives such as methylcellulose, ethylcellulose and hydroxypropylcellulose; an IPN (Inter-penetrating network) of cross-linked poly(meth)acrylamide and cross-linked poly(meth)acrylic acid, and partially neutralized products thereof (in which acrylic acid units are partially neutralized to form salts); and an IPN of cross-linked poly(meth)acrylic acid and a cross-linked copolymer comprising poly(meth)acrylamide as a main component, and partially neutralized products thereof. In a preferable embodiment, the polymer gel is a cross-linked product of poly(N-alkyl-substituted alkylamide), or an IPN of a cross-linked poly(meth)acrylamide and cross-linked poly(meth)acrylic acid or partially neutralized product thereof.

Stabilizers such as UV absorbers and photostabilizers may be included in the heat-responsive polymer gel as copolymer components or bound to the heat-responsive polymer gel, as long as the characteristics of the polymer gel is maintained. In a preferable embodiment, compounds selected from hindered amine compounds, hindered phenol compounds, and photostabilizing compounds are included in the heat-responsive polymer gel as compolymer components or bound to the heat-responsive polymer gel. The amount of such compounds is preferably 0.01% by mass to 5% by mass based on the mass of the polymer gel.

The average particle diameter of the heat-responsive polymer gel at the time of swelling is preferably 1 μm to 5 mm, more preferably 1 μm to 1 mm, still more preferably 5 μm to 100 μm. When the average particle diameter is not smaller than 0.01 μm, sufficient optical characteristics can be obtained and the gel particles are unlikely to aggregate, whereby handling of the gel particles at the point of use is easy. When the average particle diameter is not larger than 5 mm, the response speed of the resultant optical element is increased and the graininess of the optical element is improved.

The heat-responsive polymer gel particles may be prepared by physically pulverizing a polymer gel, or by chemically dividing a polymer gel into particles prior to cross-linking, followed by cross-linking. Alternatively, the polymer gel particles may be prepared by a common polymerization method for obtaining polymer particles such as an emulsion polymerization method, a suspension polymerization, or a dispersion polymerization. In an embodiment, a polymer before cross-linking is fiberized by being extruded from a nozzle and then the fiber is cross-linked then pulverized to form polymer gel particles. In another embodiment, a polymer before cross-linking is fiberized by being extruded from a nozzle, and then the fiber is pulverized into particles then cross-linked to form polymer gel particles.

2. Light Controlling Material

In the invention, light controlling materials included in the polymer gel or adsorbed by the surface of the polymer gel may be selected from dyes, pigments, and light scattering materials. In a preferable embodiment, such light controlling materials are fixed to the heat-responsive polymer gel physically or chemically.

2-1. Dye

Preferable examples of the dye include: nigrosine-based dyes in black; azo dyes in red, green, blue, cyan, magenta, yellow and the like; anthraquinone-based dyes; indigo-based dyes; phthalocyanine-based dyes; carbonium dyes; quinoimine dyes; methane dyes; quinoline dyes; nitro dyes; benzoquinone dyes; naphthoquinone dyes; naphthalimide dyes; and berinone dyes. Among them, dyes having high light absorption coefficients are preferable.

Specific examples thereof include: C. I. Direct Yellow 1, 8, 11, 12, 24, 26, 27, 28, 33, 39, 44, 50, 58, 85, 86, 87, 88, 89, 98 and 157; C. I. Acid Yellow 1, 3, 7, 11, 17, 19, 23, 25, 29, 38, 44, 79, 127, 144 and 245; C. I. Basic Yellow 1, 2, 11 and 34; C. I. Food Yellow 4, C. I. Reactive Yellow 37, C. I. Solvent Yellow 6, 9, 17, 31, 35, 100, 102, 103 and 105; C. I. Direct Red 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230 and 231; C. I. Acid Red 1, 6, 8, 9, 13, 14, 18, 26, 27, 35, 37, 42, 52, 82, 85, 87, 89, 92, 97, 106, 111, 114, 115, 118, 134, 158, 186, 249, 254 and 289; C. I. Basic Red 1, 2, 9, 12, 14, 17, 18 and 37; C. I. Food Red 14; C. I. Reactive Red 23 and 180; C. I. Solvent Red 5, 16, 17, 18, 19, 22, 23, 143, 145, 146, 149, 150, 151, 157 and 158; C. I. Direct Blue 1, 2, 6, 15, 22, 25, 41, 71, 76, 78, 86, 87, 90, 98, 163, 165, 199 and 202; C. I. Acid Blue 1, 7, 9, 22, 23, 25, 29, 40, 41, 43, 45, 78, 80, 82, 92, 93, 127 and 249; C. I. Basic Blue 1, 3, 5, 7, 9, 22, 24, 25, 26, 28 and 29; C. I. Food Blue 2, C. I. Solvent Blue 22, 63, 78, 83 to 86, 191, 194, 195 and 104; C. I. Direct Black 2, 7, 19, 22, 24, 32, 38, 51, 56, 63, 71, 74, 75, 77, 108, 154, 168 and 171; C. I. Acid Black 1, 2, 7, 24, 26, 29, 31, 44, 48, 50, 52 and 94; C. I. Basic Black 2 and 8; C. I. Food Black 1 and 2; C. I. Reactive Black 31; C. I. Food Violet 2; C. I. Solvent Violet 31, 33 and 37; C. I. Solvent Green 24 and 25; C. I. Solvent Brown 3 and 9 and the like. Only a single dye may be used, or two or more dyes may be mixed and used in order to obtain a desired hue.

2-2. Pigment

Specific examples of the pigment include: black pigments such as titanium black and various kinds of carbon black (for example, channel black and furnace black); white pigments such as metal oxides (for example titanium oxide); color pigments such as phthalocyanine-based cyan pigments, benzidine-based yellow pigments, rhodamine-based magenta pigments; and in addition, various kinds of other pigments such as anthraquinone-based pigments, azo-based pigments, azo metal complexes, phtalocyanine-based pigments, quinacridone-based pigments, perylene-based pigments, indigo-based pigments, isoindolinone-based pigments, quinacridone-based pigments, and alkylamide-based pigments.

More specific examples of the pigment include: white pigments such as inorganic oxides (such as zinc oxide, basic lead carbonate, basic lead sulfate, lead sulfate, lithopone, muscovite, zinc sulfide, titanium oxide, antimony oxide, lead white, zirconium oxide, alumina, micanite, micalex, quartz, calcium carbonate, gypsum, clay, silica, silicic acid, diatomaceous earth, talc, basic magnesium carbonate, alumina white, gloss white, and satin white); metal materials such as zinc, alumel, antimony, aluminum, aluminum alloy, iridium, indium, osmium, chrome, chromel, cobalt, zirconium, stainless steel, gold, silver, German silver, copper, bronze, tin, tungsten, tungsten steel, iron, lead, nickel, nickel alloy, nickelin, platinum, platinum-rhodium, tantalum, duralmin, nichrome, titanium, Krupp austenite steel, constantan, brass, platinum-iridium, palladium, palladium alloy, molybdenum, molybdenum steel, manganese, manganese alloy, rhodium, and rhodium alloy; pigments comprising polymer materials such as phenol resin, furan resin, xylene-formaldehyde resin, urea resin, melamine resin, aniline resin, alkyd resin, unsaturated polyester, epoxy resin, polyethylene, polypropylene, polystyrene, poly-p-xylylene, polyvinyl acetate, acrylic resin, methacrylic resin, polyvinyl chloride, polyvinylidene chloride, fluoroplastics, polyacrylonitrile, polyvinyl ether, polyvinyl ketone, polyether, polycarbonate, thermoplastic polyester, polyamide, diene plastics, polyurethane plastics, polyphenylene, polyphenylene oxide, polysulfone, aromatic heterocyclic polymer, silicone, natural rubber plastics, and cellulose plastics.

Examples of yellow pigments include the following compounds: condensed azo compounds, isoindolinone compounds, anthraquinone compounds, azo metal complexes, methane compounds and alkylamide compounds. Specifically, examples of preferable pigments include C. I. Pigment Yellow 12, 13, 14, 15, 17, 62, 74, 83, 93, 94, 95, 109, 110, 111, 128, 129, 147, and 168.

Examples of magenta pigments include: condensed azo compounds; diketopyrrolopyrrole compounds; anthraquinone compounds; quinacridone compounds; basic dye lake compounds; naphthol compounds; benzimidazolone compounds; thioindigo compounds and perylene compounds. To be more specific, especially preferable are C. I. Pigment Red 2, 3, 5, 6, 7, 23, 48:2, 48:3, 48:4, 57:1, 81:1, 144, 146, 166, 169, 177, 184, 185, 202, 206, 220, 221 and 254.

Examples of cyan pigments include: copper-phthalocyanine compound and derivatives thereof; anthraquinone compounds; and basic dye lake compounds. To be specific, especially preferable are C. I. Pigment Blue 1, 7, 15, 15:1, 15:2, 15:3, 15:4, 60, 62, and 66.

The volume-average particle size of the primary particle diameter of the pigment is preferably 0.001 μm to 1 μm, more preferably 0.02 μm to 0.2 μm. When the volume-average particle diameter is not smaller than 0.001 μm, the pigment is unlikely to be lost from the polymer gel. When the volume-average particle diameter is not larger than 1 μm, the color developability and the light scattering characteristic of the resultant optical element is excellent.

2-3. Light Scattering Material

The light scattering material may be an inorganic material or an organic material. Specific examples of the inorganic material include inorganic oxides such as zinc oxide, basic lead carbonate, basic lead sulfate, lead sulfate, lithopone, muscovite, zinc sulfide, titanium oxide, antimony oxide, lead white, zirconium oxide, alumina, micanite, micalex, quartz, calcium carbonate, gypsum, clay, silica, silicic acid, diatomaceous earth, talc, basic magnesium carbonate, alumina white, gloss white, and satin white; metal materials such as zinc, alumel, antimony, aluminum, aluminum alloy, iridium, indium, osmium, chrome, chromel, cobalt, zirconium, stainless steel, gold, silver, German silver, copper, bronze, tin, tungsten, tungsten steel, iron, lead, nickel, nickel alloy, nickelin, platinum, platinum-rhodium, tantalum, duralmin, nichrome, titanium, Krupp austenite steel, constantan, brass, platinum-iridium, palladium, palladium alloy, molybdenum, molybdenum steel, manganese, manganese alloy, rhodium, and rhodium alloy; and inorganic conductive materials such as ITO (indium tin oxide). The light scattering material is preferably mica, aluminum, or an analogue thereof when a layer of the light scattering material is coated.

Specific examples of the organic material include: polymer materials such as phenol resin, furan resin, xylene-formaldehyde resin, urea resin, melamine resin, aniline resin, alkyd resin, unsaturated polyester, epoxy resin, polyethylene, polypropylene, polystyrene, poly-p-xylylene, polyvinyl acetate, acrylic resin, methacrylic resin, polyvinyl chloride, polyvinylidene chloride, fluoroplastics, polyacrylonitrile, polyvinyl ether, polyvinyl ketone, polyether, polycarbonate, thermoplastic polyester, polyamide, diene plastics, polyurethane plastics, polyphenylene, polyphenylene oxide, polysulfone, aromatic heterocyclic polymer, silicone, natural rubber plastics, cellulose plastics, and mixed materials (polymer blends) each containing two or more polymers selected from the above-cited polymers.

2.4 Other Details

It is also preferable to use a chemically-modified light controlling material. Such a chemically-modified light controlling material may be, for example, a light controlling material having a group for binding to the polymer gel which may be a polymerizable group or a group capable of undergoing an addition reaction, or a light controlling material having a group capable of interacting with the polymer gel such as a group which can be ionically bonded to the polymer gel.

As described above, the pigment or the light scattering material has to be contained in the polymer gel or adsorbed by the surface of the polymer gel such that the pigment or the light scattering material are not lost from the polymer gel. In an embodiment, the cross-linking density of the polymer gel is optimized so as to physically confine the pigment or the light scattering material in the polymer network. It is also preferable to use a pigment or a light controlling material which can establish strong interaction with the polymer gel; the interaction may be an electric interaction, an ionic interaction, or a physical interaction other than the interactions described above. Further, it is preferable to use a pigment or light controlling material whose surface has been chemically modified. The chemical modification of the surface may be introduction of a group capable of forming a chemical bond to the polymer gel such as an unsaturated group (for example, vinyl group) or a unpaired electron (radical), or formation of a graft bond to a polymer material.

A polymer gel containing a light controlling material may be prepared by a method comprising uniformly dispersing the light controlling material in the polymer before cross-linking, and cross-linking the polymer; or by a method comprising adding the light controlling material to a monomer composition at the time of polymerization. In an embodiment, a pigment or a light scattering material is added at the time of polymerization, and the pigment or light scattering material has a polymerizable group or a unpaired electron (radical) as described above, so that the pigment or light scattering material is chemically bonded to the polymer gel.

In a preferable embodiment, the light controlling material is dispersed in the optical material as uniformly as possible. It is preferable to disperse the light controlling material in the polymer uniformly by using a mechanical kneading method, a stirring method, or a dispersant. Polymer gel particles containing the light controlling material can be prepared in the same manner as the preparation of polymer gel particles described above.

When a responsive polymer gel contains a light controlling material in an amount which is not lower than the saturated absorption concentration and the light transmittance is changed by local aggregation of the light controlling material caused by contraction of polymer gel, the amount of the light controlling material is preferably such an amount that the concentration of the light controlling material at the time of drying or contraction is not lower than the saturated absorption (or scattering) concentration. The term "saturated absorption (or scattering) concentration" refers to a concentration at which the relationship between the light controlling material concentration and the light absorption with a fixed light path length starts to deviate from the linear relationship. When a light controlling material in such an amount is added to a heat-responsive polymer gel, the optical density and/or scattering can be changed by swelling and contraction of the heat-responsive polymer gel.

In order to make the concentration of the light controlling material not lower than the saturated absorption concentration, the concentration of the light controlling material is generally not lower than 3% by mass. It is preferable to add a light controlling material to a heat-responsive polymer gel such that the concentration of the light controlling material in the polymer gel is 3% by mass to 95% by mass, more preferably 5% by mass to 80% by mass. When the concentration is 3% by mass or higher, the effects of the addition of the light controlling material can be obtained sufficiently. When the concentration is 95% by mass or lower, the characteristics of the heat-responsive polymer gel are superior.

When the optical density is changed by the volume change of a responsive polymer gel to which a dye is attached, the amount of the dye is 1% by mass to 90% by mass based on the mass of the responsive polymer gel, more preferably 10% by mass to 70% by mass based on the mass of the responsive polymer gel, still more preferably 15% by mass to 60% by mass based on the mass of the responsive polymer gel. When the amount is not smaller than 1% by mass, the effects of the addition of the dye are sufficiently obtained. When the amount is not larger than 90% by mass, the characteristics of the heat-responsive polymer gel are maintained.

When the change of light scattering is utilized which is caused by change in shape of a responsive polymer gel having a surface on which a pigment is adsorbed, the amount of the pigment is preferably 0.5% by mass to 70% by mass based on the mass of the responsive polymer gel, more preferably 10% by mass to 50% by mass based on the mass of the responsive polymer gel. When the amount is not smaller than 0.5% by mass, the effects of the addition of the pigment are sufficiently obtained. When the amount is not larger than 70% by mass, the characteristics of the heat-responsive polymer gel are maintained.

3. Ionic Liquid

The ionic liquid used in the invention is not particularly limited as long as the liquid is a salt which takes a molten state around room temperature. For example, the chemical structure of such a salt may include a cationic structure such as imidazolium salt, pyridinium salt, aliphatic ammonium salt, pyridine, pyrrolidine, imidazol, alicyclic amine, aliphatic amine, uronic acid, or guanidine structure, or an anionic structure such as a sulfonic acid, sulfuric acid, an amide, an imide, tosylic acid, boric acid, phosphoric acid, antimonic acid, or carboxyl group structure. In a preferable embodiment, the salt is a salt of imidazolium, pyridinium, or aliphatic ammonium.

Specific examples of the ionic liquid include
1-ethyl-3-methylimidazolium bromide,
1-ethyl-3-methylimidazolium chloride,
1-ethyl-3-methylimidazolium lactate,
1-ethyl-3-methylimidazolium hexafluorophosphate,
1-ethyl-3-methylimidazolium bromide tetrafluoroborate,
1-ethyl-3-methylimidazolium trifluoromethansulfonate,
1-butyl-3-methylimidazolium bromide,
1-butyl-3-methylimidazolium chloride,
hexafluorophosphate-1-butyl-3-methylimidazolium tetrafluoroborate, 1-butyl-3-methylimidazolium trifluoromethanesulfonate, 1-butyl-3methylimidazolium lactate,
1-hexyl-3-methylimidazolium bromide,
1-hexyl-3-methylimidazolium chloride,
1-hexyl-3-methylimidazolium lactate,
1-hexyl-3-methylimidazolium hexafluorophosphate,
1-hexyl-3-methylimidazolium bromide tetrafluoroborate,
1-ethyl-3-methylimidazolium trifluoromethanesulfonate,
1-octyl-3-methylimidazolium bromide,
1-octyl-3-methylimidazlium chloride,
1-octyl-3-methylimidazolium lactate,
1-octyl-3-methylimidazolium hexafluorophosphate,
1-octyl-3-methylimidazolium bromide tetrafluoroborate,
1-octyl-3-methylimidazolium trifluoromethane sulfonate,
1-decyl-3-methylimidazolium bromide,
1-decyl-3-methylimidazolium chloride,
1-decyl-3-methylimidazolium lactate,
1-decyl-3-methylimidazolium hexafluorophosphate,
1-decyl-3-methylimidazolium bromide tetrafluoroborate,
1-decyl-3-methylimidazolium trifluoromethanesulfonate,
1-dodecyl-3-methylimidazolium bromide,
1-dodecyl-3-methylimidazolium chloride,
1-dodecyl-3-methylimidazolium lactate,
1-dodecyl-3-methylimidazolium hexafluorophosphate,
1-dodecyl-3-methylimidazolium bromide tetrafluoroborate,
1-dodecyl-3-methylimidazolium trifluoromethane sulfonate,
1-ethyl-2,3-dimethylimidazolium bromide,
1-ethyl-2,3-dimethylimidazolium chloride,
1-ethyl-2,3-dimethylimidazolium lactate,
1-ethyl-2,3-dimethylimidazolium hexafluorophosphate,
1-ethyl-2,3-dimethylimidazolium bromide tetrafluoroborate,
1-ethyl-2,3-dimethylimidazolium trifluoromethanesulfonate,
1-butyl-2,3-dimethylimidazolium bromide,
1-butyl-2,3-dimethylimidazolium chloride,
hexafluorophosphate-1-butyl-2,3-dimethylimidazolium tetrafluoroborate, 1-butyl-2,3-dimethylimidazolium trifluoromethanesulfonate, 1-butyl-2,3-dimethylimidazolium lactate, 1-hexyl-2,3-dimethylimidazolium bromide,
1-hexyl-2,3-dimethylimidazolium chloride,
1-hexyl-2,3-dimethylimidazolium lactate,
1-hexyl-2,3-dimethylimidazolium hexafluorophosphate,
1-hexyl-2,3-dimethylimidazolium bromide tetrafluoroborate,
1-ethyl-2,3-dimethylimidazolium trifluoromethanesulfonate,
1-octyl-2,3-dimethylimidazolium bromide,
1-octyl-2,3-dimethylimidazolium chloride,
1-octyl-2,3-dimethylimidazolium lactate,
1-octyl-2,3-dimethylimidazolium hexafluorophosphate,
1-octyl-2,3-dimethylimidazolium bromide tetrafluoroborate,
1-octyl-2,3-dimethylimidazolium trifluoromethanesulfonate,
1-decyl-2,3-dimethylimidazolium bromide,
1-decyl-2,3-dimethylimidazolium chloride,
1-decyl-2,3-dimethylimidazolium lactate,
1-decyl-2,3-dimethylimidazolium hexafluorophosphate,
1-decyl-2,3-dimethylimidazolium bromide tetrafluoroborate,
1-decyl-2,3-dimethylimidazolium trifluoromethanesulonate,
1-dodecyl-2,3-dimethylimidazolium bromide,
1-dodecyl-2,3-dimethylimidazolium chloride,
1-dodecyl-2,3-dimethylimidazolium lactate,
1-dodecyl-2,3-dimethylimidazolium hexafluorophosphate,
1-dodecyl-2,3-dimethylimidazolium bromide tetrafluoroborate,
1-dodecyl-2,3-dimethylimidazolum trifluoromethanesulfonate,
1-ethylpyridinium bromide, 1-ethylpyridinium chloride,
1-ethylpyridinium lactate, 1-ethylpyridinium
hexafluorophosphate, 1-ethylpyridinium tetrafluoroborate,
1-ethylpyridinium trifluoromethanesulfonate, 1-butylpyridinium
bromide, 1-butylpyridinium chloride, 1-butylpyridinium lactate,
1-butylpyridinium hexafluorophosphate, 1-butylpyridinium
tetrafluoroborate, 1-butylpyridinium trifluoromethanesulfonate,
1-hexylpyridinium bromide, 1-hexylpyridinium chloride,
1-heyxlpyridinium lactate, 1-hexylpyridinium
hexafluorophosphate, 1-hexylpyridinium tetrafluoroborate,
1-hexylpyridinium trifluoromethanesulfonate,
N,N,N-trimethyl-N-propylammonium bromide,
N,N,N-trimethyl-N-propylammonium chloride,
N,N,N-trimethyl-N-propylammonium lactate,
N,N,N-trimethyl-N-propylammonium hexafluorophosphate,
N,N,N-trimethyl-N-propylammonium tetrafluoroborate,
N,N,N-trimethyl-N-propylammonium bis(trifluoromethanesulfonylimide),
N,N-dimethyl-N-methyl-N-(2-methoxyethyl)ammonium chloride,
N,N-dimethyl-N-methyl-N-(2-methoxyethyl)ammonium bromide,
N,N-dimethyl-N-methyl-N-(2-methoxyethyl)ammonium lactate, N,
N-dimethyl-N-methyl-N-(2-methyoxyethyl)ammonium hexafluorophosphate, and
N,N-dimethyl-N-methyl-N-(2-methyoxyethyl)ammonium trifluoromethane sulfonate.

Only a single ionic liquid may be used, or a mixture of two or more ionic liquids may be used.

In the invention, the ionic liquid is preferably an imidazolium salt, a pyridinium salt, or an aliphatic amine, or an arbitrary combination thereof.

The ionic liquids described above hardly evaporate and many of then have allowable temperature limits which are above 400° C. Accordingly, it is possible to control light by using a polymer gel at such a high temperature that water or other conventional organic solvents cannot tolerate.

Further, the ionic liquids are transparent and quite suitable for optical elements.

The ionic liquid may include substances selected from stabilizers such as dispersion stabilizers, antioxidants, and UV absorbers, antimicrobial agents, and antiseptics. The ionic liquid may further include (as a solute) a substance which can modify the volume change characteristic of the heat-responsive polymer gel. Further, the heat-responsive polymer gel may include a colorant such as a pigment, a white pigment, or a dye.

The mixing ratio by mass of the heat-responsive polymer gel to the ionic liquid is preferably in the range of 1/2000 to 1/5 (polymer gel/liquid), more preferably in the range of 1/300 to 1/15. When the ratio is 1/2000 or higher, the mechanical strength of the composition is excellent. When the ratio is 1/5 or lower, the volume change and the response speed upon stimulation is enhanced.

4. Optical Element

In the following, the optical element using the optical material of the invention is described.

In an embodiment, the optical element comprises two substrates and the optical material of the invention between the substrates, and the optical material is sealed in the space between the substrates. In this embodiment, the optical element can control light and change the displayed color by applying an external stimuli such as heat to the responsive polymer gel.

In a preferable embodiment, the optical element comprises two substrates and the optical material of the invention between the substrates, the optical material is sealed in the space between the substrates, and the substrates have a pair of stimulus-applying device.

Figure 1B:
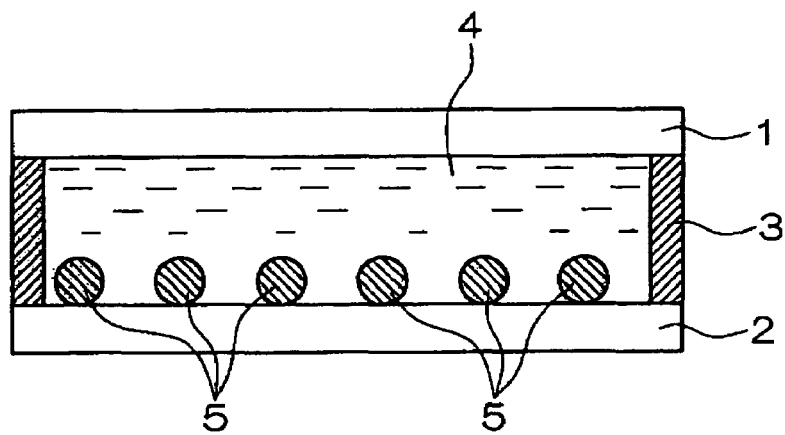

FIGS. 1A and 1B illustrates an exemplary embodiment. FIG. 1A illustrates the optical element at the time of swelling of the polymer gel. FIG. 1B illustrates the optical element at the time of contraction of the polymer gel. The polymer gel changes its volume (swelling or contraction) according to a change in temperature.

As shown in FIGS. 1A and 1B, the optical element of the invention basically has a structure in which an optical material is sandwiched between two substrates (a substrate 1 and a substrate 2) which are disposed at a predetermined distance from each other. A polymer gel 5 (represented by hatched circle in FIGS. 1A and 1B) is preferably in the form of particles. In a preferable embodiment, the polymer gel particles are located or fixed to the neighborhood of one of the substrates. An ionic liquid 4 which is absorbed and released by the polymer gel is disposed in the space between the substrates. A sealing element (a sealing portion 3) is provided between the two substrates along the periphery of the substrates. The sealing portion 3 prevents leakage of the ionic liquid 4 and provides the optical element with stability.

In an embodiment, the polymer gel particles are located in the neighborhood of the substrate by being fixed to the substrate. The polymer gel particles may be fixed to the substrate by using a bifunctional compound or an adhesive or a physical means. For example, the polymer gel particles may be fixed to the substrate by a method comprising: treating the surface of the substrate with a reactive silane coupling agent to introduce functional groups to the surface; and then allowing the functional groups on the surface of the substrate to react with functional groups on the polymer gel particles to form covalent bonds. Other methods are also available such as a method comprising using a multi-functional compound or an adhesive to fix the polymer gel particles to the substrate, and a method comprising modifying the shape of the surface of the substrate three-dimensionally and fixing the polymer gel particles to the surface physically. When the polymer gel particles contact the substrate too closely, the response characteristics sometimes deteriorate. Therefore, the following methods may be employed to secure suitable space between the polymer gel particles and the substrate: a method comprising modifying the shape of the surface of the substrate three-dimensionally to make convex portions and fixing the polymer gel particles to the convex portions on the surface, and a method comprising fixing the polymer gel particles to the surface of the substrate via a compound (spacer) having a long chain so as to secure the space between the polymer gel particles and the substrate.

The denseness of the polymer gel particles located on or fixed to the substrate largely affects light controlling characteristics and color changing properties of the resultant optical element. Therefore, the denseness is preferably adjusted to a predetermined denseness.

Here, a "fixing denseness" is assumed to refer to a proportion of the total area of portions occupied by the polymer gel particles at the time of maximum swelling to the total area of the substrate surface when viewed from a direction which is perpendicular to the substrate. In other words, the "fixing denseness" refers to a proportion of the area of the orthogonal projections of the polymer gel particles onto the substrate surface to the effective area of the substrate. The fixing denseness is preferably 30% to 95%, more preferably 50% to 95%. When the fixing denseness is lower than 30%, light controlling characteristics of the optical element are likely to be deteriorated. When the fixing denseness is higher than 95%, the gel particles are likely to be unfixed because of the pressure between the gel particles, or the response of the optical element is likely to be lowered.

The ratio of the dry amount of the polymer gel particles to the amount of the ionic liquid in the space between the substrates is preferably 0.01% to 10% by mass, more preferably 0.1% to 3% by mass. The dry amount of the polymer gel particles refers to an amount of the polymer gel particles after the solvent is removed from the polymer gel particles by a freeze-drying instrument. When the above ratio is lower than 0.01% by mass, the light controlling characteristics are likely to be deteriorated. When the ratio is higher than 10% by mass, the gel particles are likely to be unfixed because of the pressure between the gel particles, or the response of the optical element is likely to be lowered.

Examples of the material of the substrate include glass, metals, ceramics, polyester, polyimide, poly(methyl methacrylate), polystyrene, polypropylene, polyethylene, nylon, polyvinyl chloride, polyvinylidene chloride, polycarbonate, polyethersulfone, polyallylate, and cellulose derivatives.

At least one of the substrates has to be transparent. In the case of a transmission-type optical element, both substrate are preferably transparent.

The thickness and size of the substrate are not particularly limited and may be selected from wide ranges in accordance with the desired optical element. The thickness of the substrate is preferably 10 µm to 50 mm.

The thickness of the optical material disposed between the substrates shown in FIGS. 1A and 1B is usually 1 µm to 5 mm, more preferably 2 µm to 500 µm. When the optical material has such a thickness, the resultant optical element has an excellent response to heat. When the thickness is smaller than 1 µm, the optical density of the developed color is too low to obtain the desired contrast. When the thickness is larger than 5 mm, the response characteristics are likely to be deteriorated.

Further, it is preferable to provide a stimulus-applying device to the optical element. With such a stimulus-applying device, the optical element can perform its function on its own. The stimulus-applying device is a device which can substantially applies heat to the polymer gel, and the device may be an electric resistance heating device, a light applying device, an electromagnetic wave applying device, or a magnetic field applying device. The stimulus-applying device is preferably a resistor which can emit heat by resistance heating. The resistor may be, for example: a metal layer such as Ni—Cr alloy; a layer of a metal oxidant such as tantalum boride, tantalum nitride, tantalum oxide, or ITO; or a carbon layer. Heat is emitted when an electric current is applied to a circuit including such a layer. Alternatively, heat can be applied indirectly, for example in the form of light, magnetic field, or electromagnetic wave. The light applying device may be a laser, an LED, or a luminescence element layer such as EL (Electroluminescence element). The magnetic field applying device and the electromagnetic wave applying device may be selected from electromagnetic coils and electrodes. The heat-stimulus applying device is preferably patterned and/or segmented such that an arbitrary portion of the optical element can be heated selectively. It is also preferable to dispose (fix) the polymer gel particles in accordance with the pattern of the heat-stimulus applying device.

In another embodiment, heat is indirectly applied to the optical device in the form of a radiation such as light, infrared light, or electromagnetic wave, so as to operate the optical element.

The optical element may have other layers. For example, the optical element may be provided with layers for protecting the optical element such as protective layers, antifouling layers, UV absorbing layers, and antistatic layers.

An exemplary method of preparing the optical element will be described with reference to exemplary embodiment shown in FIGS. 1A and 1B.

Two substrates are prepared and polymer gel particles are fixed to at least one of the substrates by any of the methods described above. Then, the substrates are attached to each other such that a predetermined space is secured between the substrates, so as to make cells. The distance between the substrates is generally 1 µm to 5 mm. In order to adjust the distance to the desired distance, the following methods may be used: a method comprising scattering spacer particles, a method comprising using a film spacer, and a method comprising forming a three-dimensional structure on the substrate which structure secures the distance. When the two substrates are attached to each other, the periphery of the space between the substrates are sealed by an adhesive, a UV-curable resin, or a thermosetting resin, except for a specified opening. An ionic liquid is injected into the space between the substrates through the opening by a reduced-pressure injection method or a pressurized injection method. Then, the opening is sealed to form an optical element. In another embodiment, a mixture of a polymer gel and an ionic liquid is injected into the cells formed as described above, and then the opening is sealed to form an optical element.

The optical element of the invention exhibit light controlling function in response to the applied heat. The specific manners of the function may be varied by appropriately selecting the light controlling material and by changing the content of the light controlling material. For example, in an embodiment, the optical element transmits light when heated, and shields light when cooled. In another embodiment, the optical element shields light when heated and transmits light when cooled. In another embodiment, the optical element displays white color when heated and displays another color when cooled.

The optical element of the invention may be used in a light controlling device or filter which controls the amount of transmitted light, or in a display device which displays images. Further, the optical element may be used also as a sensor.

EXAMPLES

Example 1

(Preparation of Optical Material)

1) Preparation of Polymer Gel 10 g of N-isopropylacrylamide as a main monomer, 0.1 g of methylenebisacrylamide as a cross-linking agent, 20 g of distilled water, 0.1 g o ammonium persulfate, and 8.0 g of a blue pigment (microcapsulated blue pigment MC BLUE, manufactured by Dainippon Ink and Chemicals Incorporated.) having a primary particle diameter of 0.1 μm as a light controlling material, are mixed by stirring to form an aqueous solution A. The preparation of the aqueous solution A is conducted in a nitrogen atmosphere. A reaction vessel is prepared and the air in the reaction vessel is replaced by nitrogen. A solution obtained by dissolving 1.0 g of a sorbitol-type surfactant (SORGEN 50, manufactured by Daiichi Kogyo Seiyaku Co., Ltd.) in 200 ml of cyclohexane is put in the reaction vessel. The aqueous solution A is added to the reaction vessel and the mixture is stirred at a high speed by a rotary-type stirring instrument, so that the mixture is emulsified. Then, the temperature of the reaction system is adjusted to 20° C. and a 50% aqueous solution of tetramethylethylenediamine is added to the mixture while the mixture is stirred, so as to conduct polymerization. Then, the obtained colored polymer gel particles are collected, and washed with water to give a gel dispersion liquid B.

2) Preparation of Ionic Liquid

Ethyl bromide is added to 1-methylimidazol to form 1-ethyl-3-methylimidazol, which is then recrystallized. Then, lithium bis(trifluoromethanesulfonyl) is added to 1-ethyl-3-methylimidazol to form 1-ethyl-3-methylimidazolium trifluoromethanesulfonate. The obtained ionic liquid is colorless transparent liquid.

(Checking of Operation of Optical Element)

The obtained gel dispersion liquid B is solidified by liquid nitrogen and processed by a freeze-drying instrument to give a dry gel C. The volume-average particle diameter of the dry gel C is about 15 μm. The amount of pure water which can be absorbed by this colored polymer gel particles at 20° C. is about 38 g/g.

Figure 2:
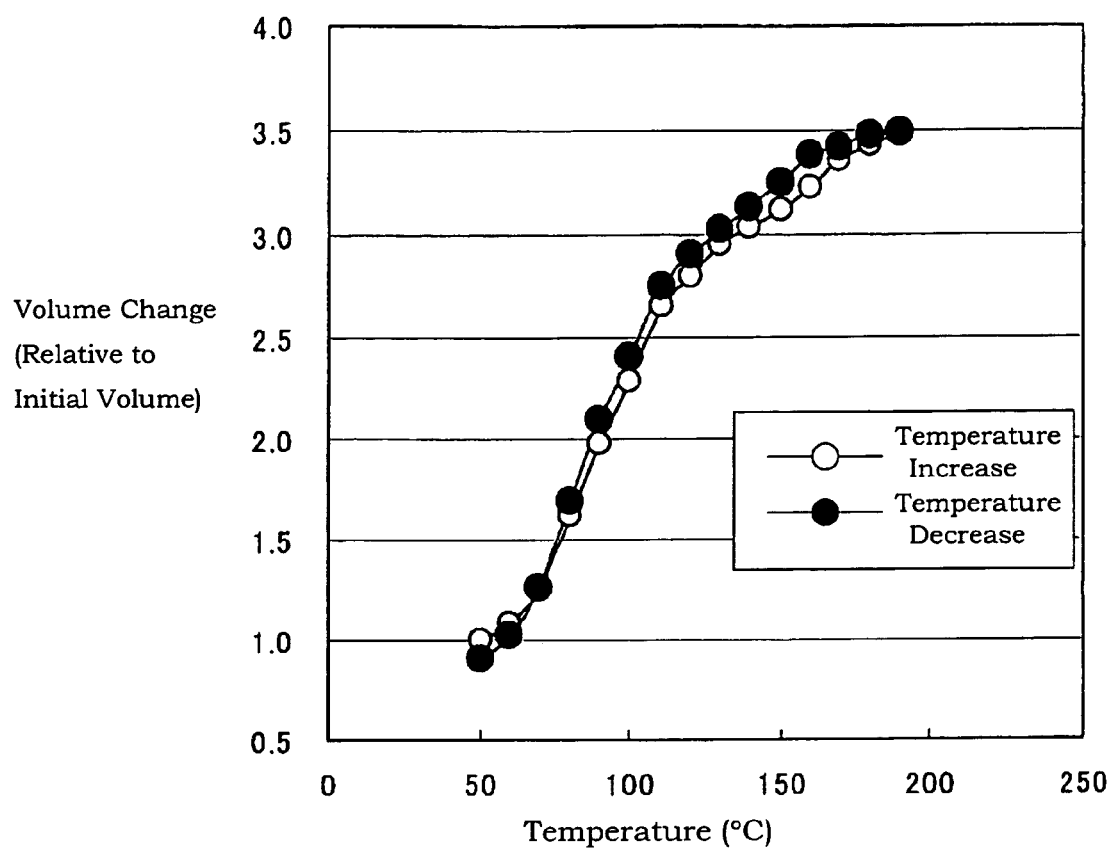
FIG. 2 is a graph illustrating temperature dependency of swelling of the gel in Example 1.

A small amount of the dry gel C is added to 1-ethyl-3-methylimidazolium trifluoromethanesulfonate to give an optical material D. The optical material D is disposed in the space between two substrates separated by a spacer. The obtained structure is put in a thermosystem manufactured by Mettler Toledo Gmbh, and the temperature is raised and decreased each at a rate of 5° C. per minute while the swelling of the gel in the ionic liquid is observed by a microscope. The results are shown in FIG. 2.

The gel swells as the temperature is raised, and the gel existed stably without being decomposed even above 200° C. The profile of the volume change during the temperature decrease is almost the same as that during the temperature increase. Accordingly, the volume change has excellent reversibility and the optical material has superior characteristics.

Example 2

Figure 3:
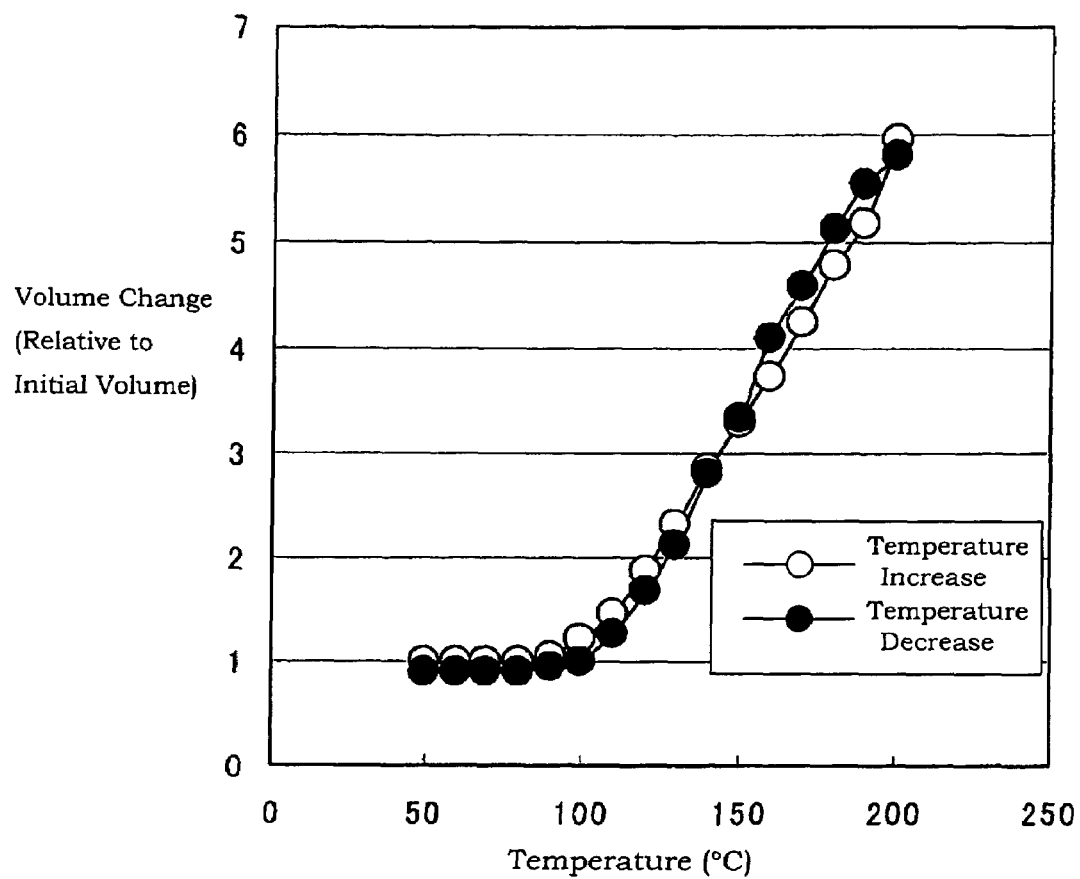
FIG. 3 is a graph illustrating temperature dependency of swelling of the gel in Example 2.

A small amount of the dry gel C is added to 1-butylpyridinium trifluoromethanesulfonate to give an optical material E. The optical material E is disposed in the space between two substrates separated by a spacer. The obtained structure is put in a thermosystem manufactured by Mettler Toledo Gmbh, and the temperature is raised and decreased each at a rate of 5° C. per minute while the swelling of the gel in the ionic liquid is observed by a microscope. The results are shown in FIG. 3.

The gel swells as the temperature is raised, and the gel existed stably without being decomposed even above 200° C. The profile of the volume change during the temperature decrease is almost the same as that during the temperature increase. Accordingly, the volume change has excellent reversibility and the optical material has superior characteristics.

Example 3

Figure 4:
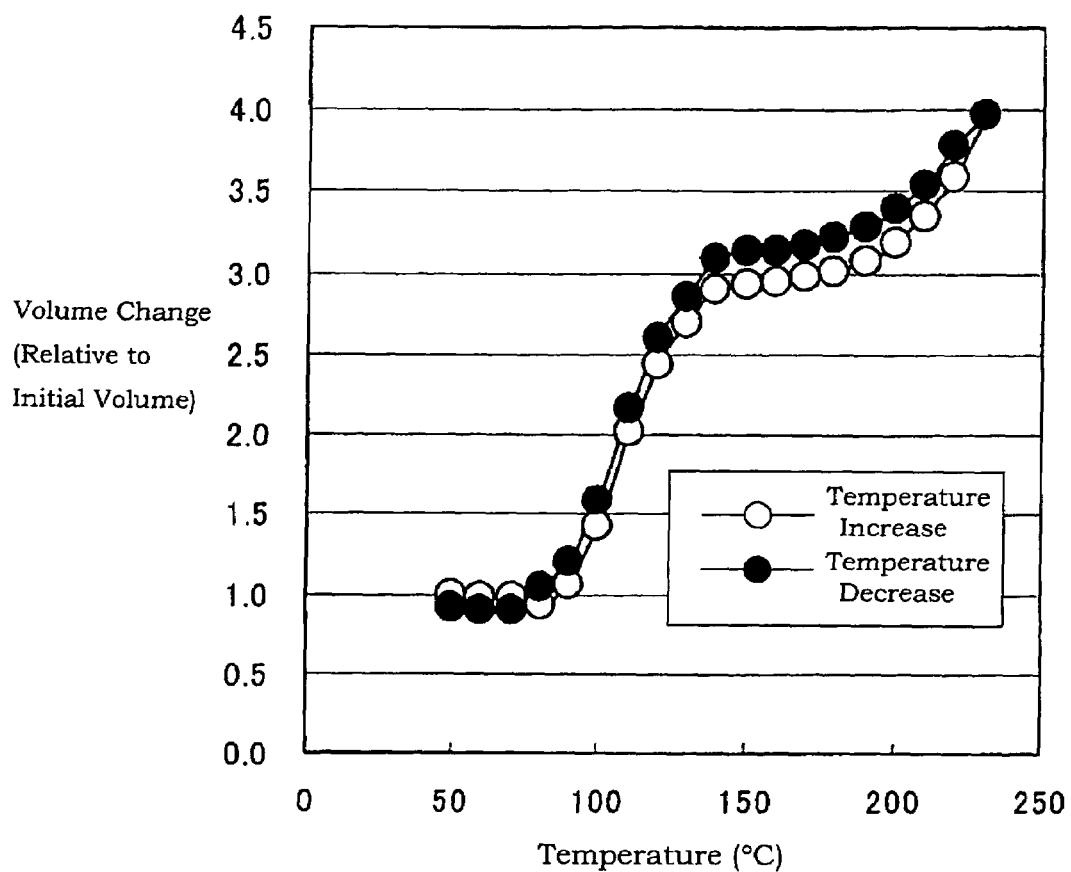
FIG. 4 is a graph illustrating temperature dependency of swelling of the gel in Example 3.

A small amount of the dry gel C is added to N,N,N-trimethyl-N-propylammonium bis(trifluoromethanesulfonylimide) to give an optical material F. The optical material F is disposed in the space between two substrates separated by a spacer. The obtained structure is put in a thermosystem manufactured by Mettler Toledo Gmbh, and the temperature is raised and decreased each at a rate of 5° C. per minute while the swelling of the gel in the ionic liquid is observed by a microscope. The results are shown in FIG. 4.

The gel swells as the temperature is raised, and the gel existed stably without being decomposed even above 200° C. The profile of the volume change during the temperature decrease is almost the same as that during the temperature increase. Accordingly, the volume change has excellent reversibility and the optical material has superior characteristics.

Example 4

(Preparation of Optical Element)

A glass substrate is immersed in an aqueous solution of a silane coupling agent to introduce bondable groups. Then, the gel dispersion liquid B is spread on the glass substrate to chemically fix the gel particles to the glass substrate. Then, the glass substrate is processed by a freeze-drying instrument to remove the solvent from the gel particles. Then, the glass substrate is attached to another unprocessed glass substrate such that a spacer having a thickness of 100 μm is sandwiched between the substrates. 1-ethyl-3-methylimidazolium trifluoromethanesulfonate is injected into the space between the two substrates and the periphery of the space between the two substrates is sealed by using a UV-curable resin (KAYARAD-R381I, manufactured by Nihon Kayaku Co., Ltd.) to form an optical element G.

(Checking of Operation of Optical Element)

The obtained optical element G is nearly transparent at 20° C. When the temperature is increased, the gel particles start to swell at around 50° C. and the optical density starts to increase. When the temperature reaches 150° C., the optical element displayed blue color and remarkably inhibited the transmission of light through the optical element; the optical element is found to have a superior light controlling properties. When the temperature is returned to room temperature, the optical element returns to the initial transparent state, thus the change of the optical element is found to be reversible.

Example 5

An optical element H is prepared in the same manner as the preparation of the optical element G in Example 4, except that 1-butylpyridinium trifluoromethanesulfonate is used in place of 1-ethyl-3-methylimidazolium trifluoromethanesulfonate. An optical element I is prepared in the same manner as the preparation of the optical element G in Example 4, except that N,N,N-trimethyl-N-propylammonium bis (trifluoromethane sulfonylimide) is used in place of 1-ethyl-3-methylimidazolium trifluoromethane sulfonate.

The operation of the obtained optical elements H and I is checked in the same manner as in Example 4. As a result, the optical elements H and I are found to have superior light controlling properties and their changes caused by the temperature change are found to be reversible.

Example 6

(Preparation of Optical Element)

Glass beads having a diameter of 50 μm are sandwiched between two polyethylene terephthalate (PET) substrates each having a thickness of 100 μm and the optical material D is injected into the space between the two substrates. The periphery of the space between the two substrates is sealed by a UV-curable resin (KAYARAD-R381I, manufactured by Nihon Kayaku Co., Ltd.) to form an optical element J.

(Checking of Operation of Optical Element)

The obtained optical element J is in the shape of a flexible film. The optical element J is nearly transparent at 20° C. When the temperature is increased, the gel particles start to swell at around 50° C. and the optical density starts to increase. When the temperature reaches 130° C., the optical element displayed blue color and remarkably inhibited the transmission of light through the optical element; the optical element is found to have a superior light controlling properties. When the temperature is returned to room temperature, the optical element returns to the initial transparent state, thus the change of the optical element is found to be reversible.

Comparative Example 1

Glass beads having a diameter of 50 μm are sandwiched between two polyethylene terephthalate (PET) substrates each having a thickness of 100 μm and the gel dispersion liquid B (whose solvent is water) is injected into the space between the two substrates. The periphery of the space between the two substrates is sealed by a UV-curable resin (KAYARAD-R381I, manufactured by Nihon Kayaku Co., Ltd.) to form an optical element X.

The optical element X of Comparative Example 1 and the optical element J of Example 6 are left in a temperature-controlled room at 80° C. and both optical elements are observed over time. Within 2 days, the solvent in the optical element X evaporates completely and the gel dries. In contrast, the optical element J exhibited no change and its light controlling properties are maintained. The observation is conducted for one month; however, the characteristics of the optical element J do not deteriorate throughout the observation period.

According to the invention, an optical material and an optical element each having stable and superior light controlling characteristics are provided. The optical material and optical element of the invention do not require costly and labour-requiring sealing technique which has been required in conventional wet devices.

What is claimed is:

1. An optical material having a fixing denseness of 30% to 95% and a thickness of 1 μm to 5 mm, comprising an ionic liquid and polymer gel particles each including a light controlling material, wherein the polymer gel particles each absorbs and/or releases the ionic liquid in accordance with a temperature change and wherein the volume change of the polymer gel particles is not lower than 5, the average particle diameter of the polymer gel particles at the time of swelling is 0.01 μm to 5 mm, and the ratio of the dry amount of the polymer gel particles to the amount of the ionic liquid is 0.01% to 10% by mass.

2. The optical material of claim 1, wherein the ionic liquid is a molten salt at room temperature.

3. The optical material of claim 2, wherein the salt has a chemical structure which includes a structure selected from the group consisting of imidazolium, pyridinium, aliphatic ammonium, pyridine, pyrrolidine, imidazole, alicyclic amine, aliphatic amine, uronic acid, and guanidine.

4. The optical material of claim 2, wherein the salt has a chemical structure which includes a structure selected from the group consisting of sulfonic acid, sulfuric acid, amide, imide, tosylic acid, boric acid, phosphoric acid, antimonic acid, and carboxyl group.

5. The optical material of claim 2, wherein the salt is selected from the group consisting of imidazolium salts, pyridinium salts, and aliphatic ammonium salts.

6. The optical material of claim 1, wherein a mixing ratio by mass of the polymer gel particles to the ionic liquid is in the range of 1/2000 to 1/5.

7. The optical material of claim 6, wherein a mixing ratio by mass of the polymer gel particles to the ionic liquid is in the range of 1/300 to 1/15.

8. The optical material of claim 1, wherein the polymer gel particles each includes a pigment, and an amount of the pigment is such an amount that a concentration of the pigment at the time of contraction of the polymer gel particles is not lower than a saturated absorption concentration.

9. The optical material of claim 1, wherein a dye is bound to the polymer gel particles.

10. The optical material of claim 1, wherein a pigment is adsorbed by the polymer gel particles.

11. The optical material of claim 1, wherein the polymer gel particles each have a network structure formed by cross-linking.

12. An optical element comprising two substrates and the optical material of claim 1 sandwiched between the substrates.

13. The optical element of claim 12, wherein the polymer gel particles each have functional groups(s) which are bonded to functional group(s) on at least one of the substrates.

14. The optical element of claim 13, wherein the polymer gel particles are bound to at least one of the substrates via a bifunctional compound or an adhesive.

15. The optical element of claim 12, wherein the polymer gel particles are physically fixed to at least one of the substrates.

16. A method of producing an optical element comprising:
 disposing two substrates at a distance of 1 μm to 5 mm from each other;

fixing polymer gel particles each including a light controlling material to at least one of the substrates at a fixing denseness of 30% to 95%;

injecting an ionic liquid into a space between the two substrates; and sealing a periphery of the space between the two substrates, wherein the volume change of the polymer gel particles is not lower than 5, the average particle diameter of the polymer gel particles at the time of swelling is 0.01 μm to 5 mm, and the ratio of the dry amount of the polymer gel particles to the amount of the ionic liquid is 0.01% to 10% by mass.

17. The method of claim 16, wherein a surface of at least one of the substrates is treated with a silane coupling agent before the fixing of the polymer gel particles.

* * * * *